(12) United States Patent
Huet

(10) Patent No.: US 6,296,136 B1
(45) Date of Patent: *Oct. 2, 2001

(54) OBTURATOR WITH IMPROVED RETENTION IN A METAL SHEET APERTURE

(75) Inventor: Laurent Huet, Meru (FR)

(73) Assignee: I.T.W. de France, Beauchamp (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,255

(22) Filed: Jul. 8, 1999

(30) Foreign Application Priority Data

Jul. 9, 1998 (FR) .................................................. 98 08825
Nov. 17, 1998 (FR) .................................................. 98 14407

(51) Int. Cl.⁷ .................................................. B65D 53/00
(52) U.S. Cl. .............................. 220/233; 16/2.1; 217/104; 217/108; 217/110; 217/113; 215/355; 215/358; 215/361; 220/787; 220/789; 220/DIG. 19; 138/89
(58) Field of Search ........................... 220/DIG. 19, 789, 220/790, 233, 254, 784, 787, FOR 101, 238; 215/355, 363, 362, 358, 361; 138/89; 296/208; 217/104, 108, 110, 113, 109; 411/344; 16/2.2, 2.1

(56) References Cited

U.S. PATENT DOCUMENTS

| | | | | |
|---|---|---|---|---|
| Re. 25,906 | * | 11/1965 | Livingstone | 220/790 X |
| 849,243 | * | 4/1907 | Hull | 215/362 |
| 1,085,262 | * | 1/1914 | Janney | 217/108 X |
| 2,228,435 | * | 1/1941 | Binon | 220/DIG. 19 X |
| 2,396,035 | * | 3/1946 | Billing et al. | 220/233 |
| 2,487,635 | * | 11/1949 | Carpenter | 220/233 X |
| 2,649,090 | * | 8/1953 | Parsons et al. | 215/355 X |
| 3,380,610 | * | 4/1968 | Krieps | 215/355 X |
| 3,430,777 | * | 3/1969 | Esposito, Jr. | 215/361 X |
| 3,438,536 | * | 4/1969 | Tarchalski | 220/782 X |
| 3,586,197 | * | 6/1971 | Vivas | 215/305 |
| 3,742,898 | * | 7/1973 | Souze | 217/108 X |
| 3,982,649 | * | 9/1976 | Wanderer | 220/DIG. 19 X |
| 4,027,776 | * | 6/1977 | Douglas | 215/355 X |
| 4,053,084 | * | 10/1977 | Anderson | 220/DIG. 19 X |
| 4,227,625 | * | 10/1980 | Underwood | 215/358 X |
| 4,287,996 | * | 9/1981 | Wanderer | 220/DIG. 19 X |
| 4,334,632 | * | 6/1982 | Watanabe | 220/787 |
| 4,413,748 | * | 11/1983 | Kessler et al. | 220/787 X |

(List continued on next page.)

FOREIGN PATENT DOCUMENTS

| | | | | |
|---|---|---|---|---|
| 218842 | * | 5/1961 | (AT) | 220/DIG. 19 |
| 31 39 968 | | 4/1983 | (DE) . | |
| 39 02 500 | | 8/1990 | (DE) . | |
| 1418151 | * | 10/1965 | (FR) | 220/233 |
| 1 354 973 | | 5/1974 | (GB) . | |
| 153832 | * | 3/1956 | (SE) | 220/233 |

*Primary Examiner*—Nathan J. Newhouse
*Assistant Examiner*—Robin A. Hylton
(74) *Attorney, Agent, or Firm*—Lowe Hauptman Gilman & Berner, LLP

(57) ABSTRACT

An obturator for an aperture (8) produced in a metal sheet (9) has a central dome (1), a peripheral lip (3) and an annular part (3) extending between the dome (1) and the lip (2). The annular part (3) has a shoulder (4). The dome (1) is adapted to deform between a starting position and a locking position of the obturator in which the dome (1) is turned inside out in relation to the starting position. The annular part is adapted to expand between the starting position and locking position and is maintained expanded by the inverted dome (1) in the locking position. The lip (2) is adapted to come into abutment against a face (9a) of the aperture (8) and the shoulder (4) is adapted to be in abutment against an opposite face (9b) of the aperture (8) in the locking position.

12 Claims, 3 Drawing Sheets

U.S. PATENT DOCUMENTS

| | | | |
|---|---|---|---|
| 4,463,870 | * | 8/1984 | Coburn, Jr. et al. ............... 220/787 |
| 4,504,009 | * | 3/1985 | Boik et al. ..................... 215/355 X |
| 4,620,641 | * | 11/1986 | Beer .............................. 220/787 X |
| 4,646,932 | * | 3/1987 | Masler .................. 220/DIG. 19 X |
| 4,691,836 | * | 9/1987 | Wassilieff ..................... 215/361 X |
| 4,938,378 | * | 7/1990 | Kraus .................... 220/DIG. 19 X |
| 5,709,309 | * | 1/1998 | Galagher et al. ............ 296/208 X |
| 6,211,464 | * | 4/2001 | Mochizuki et al. ............. 16/2.1 X |

* cited by examiner

OBTURATOR WITH IMPROVED RETENTION IN A METAL SHEET APERTURE

TECHNICAL FIELD

The present invention relates to an obturator for an aperture produced in a metal sheet, and in particular in a motor vehicle bodyshell.

BACKGROUND ART

Obturators are used to tightly close apertures generally produced in steel structures, such as those frequently encountered in motor vehicle construction.

Such obturators are made from moulded plastics material and have a peripheral rim adapted to come into tight abutment against the periphery of the aperture to be obturated. Obturators are fixed due to locking lugs which deform in the aperture upon the introduction of the obturator and which again assume, by elastic return movement, a spaced position in which these locking lugs extend beyond the contour of the aperture. Thus, the obturator is kept fixed in the aperture due to the peripheral rim and to the locking lugs situated on either side of the metal sheet in which the aperture is produced.

An object of the present invention is to provide an obturator having a simplified and reliable assembly in apertures produced in metal sheets.

SUMMARY OF THE INVENTION

A obturator according to the invention comprises a central dome, a peripheral lip, and an annular part extending between the dome and the lip. The annular part comprises a shoulder, and, the dome is adapted to deform between a starting position and a position of locking of the obturator, in which the dome is in relation to the the starting position. The annular part 15 adapted to expand between the starting position and locking position and is kept expanded by the dome inverted in the locking position. The lip is adapted to abut against a face of the aperture and the shoulder is adapted to abut against an opposite face of the aperture in the locking position.

The inversion of the dome enables the annular part to be placed under tension against the contour of the aperture and the shoulder to be kept beneath the periphery of the aperture. In contrast to known obturators in which the attachment is achieved by deformation followed by elastic return movement of the locking lugs, the locking of the obturator in accordance with the invention is reliably achieved by the expansion of the annular part which bears the shoulder.

Moreover, the inversion of the dome in the aperture of the metal structure enables a sound resonance to be caused, which informs the operator in a simple manner of the achievement of the correct locking of the obturator in the aperture.

According to a preferred characteristic of the present invention, the annular part and the dome form a groove in the starting position.

The presence of the groove enables the obturator to be introduced into the aperture without any effort. The groove easily absorbs the relative tilting of the annular part and the dome upon insertion of the obturator.

The tilting of the annular part also enables the stability of the locking position to be reinforced. In fact, the tension exerted by the dome turned inside out on the annular part counteracts the tilting in the opposite direction of the annular part towards its inclined starting position, which would allow the obturator to come out of the aperture again.

To prevent deformation of the shoulder, it is preferably delimited externally by a contour which is substantially identical, in the starting position, to the contour of the aperture.

According to an advantageous characteristic of the invention, which facilitates the positioning of the obturator and its placement in the aperture, the contour of the shoulder and the end of the lip are coplanar when the obturator is in its starting position.

According to another preferred characteristic of the invention, the annular part is substantially transverse to the peripheral lip so that the latter remains in abutment against the periphery of the aperture upon the tilting of the annular part and tilts more or less as a function of the thickness of the structure in which the aperture is made. Such an obturator may thus be mounted tightly on metal sheets of different thicknesses and also absorb the local differences in thickness around the aperture in the presence of burrs, especially when the apertures are made by punching on the reverse of the metal sheet.

According to another preferred aspect of the invention, the shoulder is formed by a series of teeth delimited by slots. Several distinct bearing points are thus provided for locking the obturator in the aperture. The slots preferably extend over the annular part as far as the dome so that the annular part is sufficiently elastic to expand during inversion of the dome.

According to an advantageous characteristic of the invention which enables the bearing points to be better distributed, the teeth are regularly distributed over the annular part.

According to another preferred characteristic of the invention, the central portion of the dome has a thicker part made of plastics material and a face domed towards the outside of the dome in the starting position and towards the inside of the dome when inverted in the locking position. This arrangement facilitates the deformation of the dome and tensions the dome walls of the in the locking position to reinforce the tensile force exerted on the annular part.

This obturator is particularly well adapted for obturating apertures which are circular in shape, as it is itself preferably circular in shape.

According to another preferred characteristic of the invention, the obturator also has a plug fixed to the central dome which is adapted, in the locking position of the obturator, to close off a cavity formed by the dome inverted and the annular part. In this manner, simultaneously with the attachment of the obturator by inverting dome, the closing of the cavity formed by the obturator in the locked position inside the aperture of the metal sheet is achieved.

The plug allows for the propagation of vibration and noise alternation at the level of the aperture in the metal sheet to provide a sound-dampening function.

Preferably, to reinforce this sound-dampening function, the plug comprises a portion forming a cap and a peripheral rim which is deformable and adapted to come up against the peripheral lip in the locking position of the obturator.

In an advantageous manner, the portion forming a cap and the peripheral lip are substantially coplanar in the locking position of the obturator, so that the plug does not form any excess thickness on the obturator.

Other details and advantages of the invention will become more apparent in the following description.

BEST MODE FOR CARRYING OUT THE INVENTION

Figure 1:
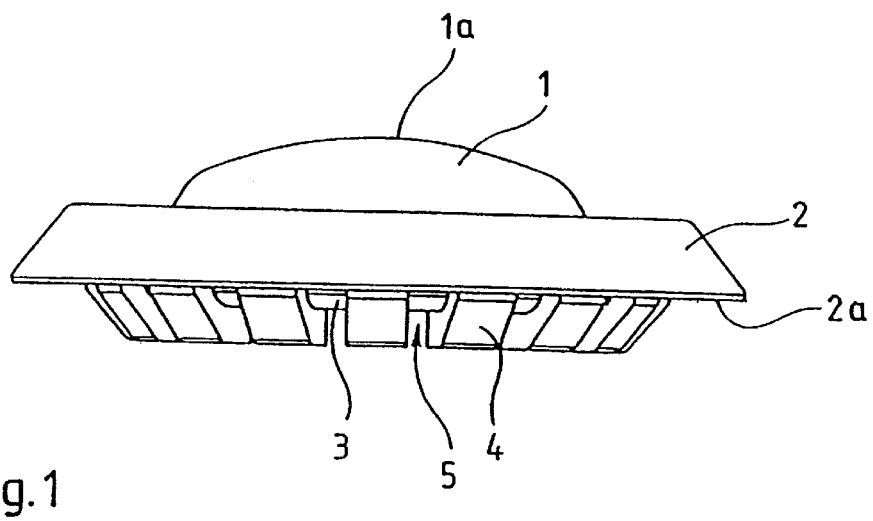
FIG. 1 is a front view of the obturator in accordance with the invention.
Figure 3:
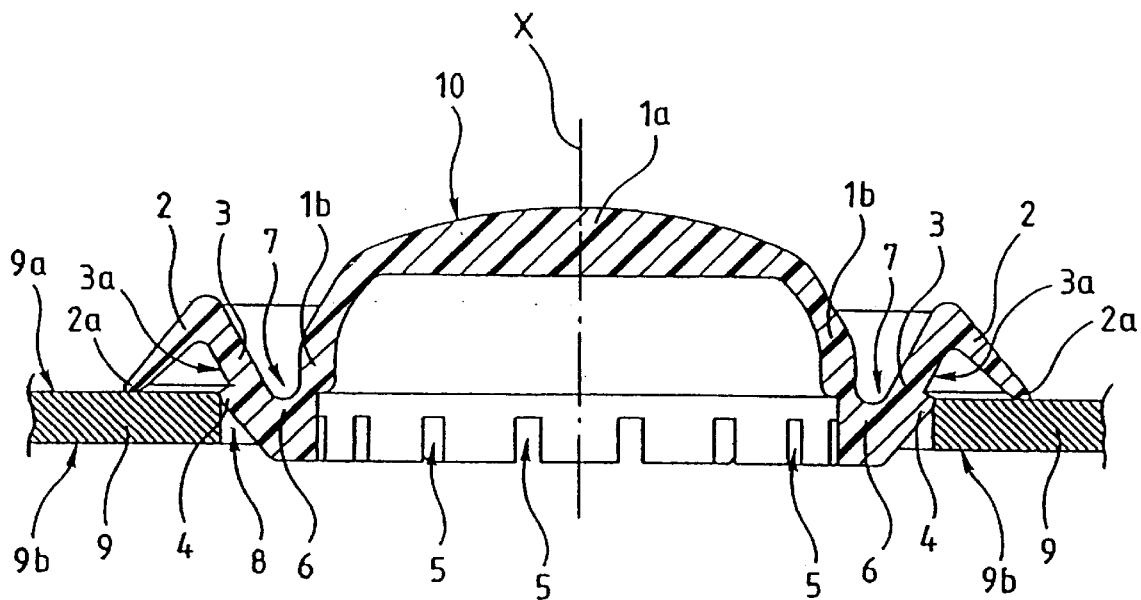
FIG. 3 is a sectional view along line III—III of FIG. 2 of the obturator in the starting position, presented on an aperture to be obturated.
Figure 4:
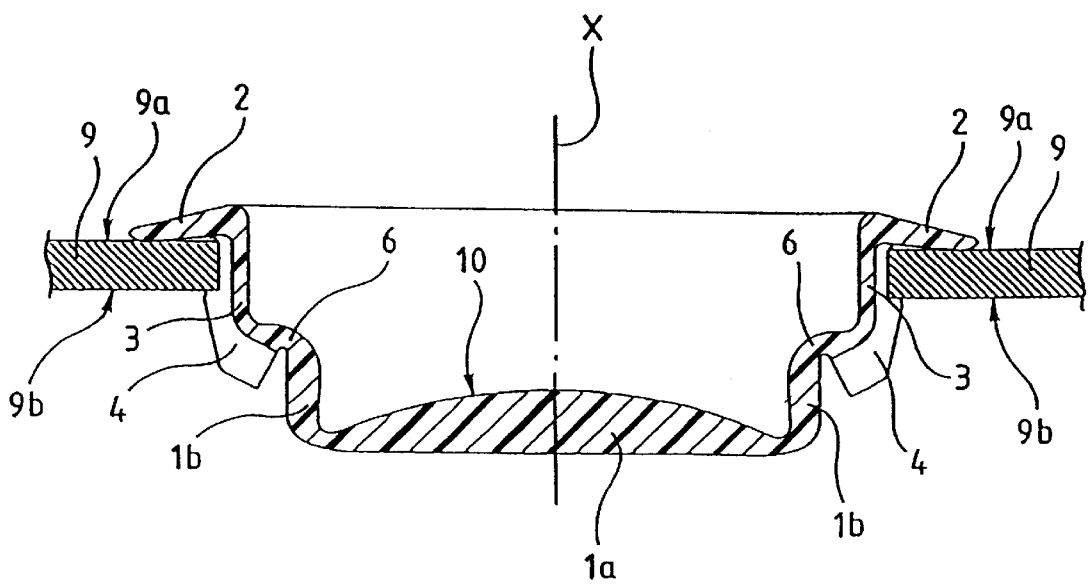
FIG. 4 is a sectional view along line IV—IV of FIG. 2 of the obturator in the locked position in an aperture.

With reference to FIG. 1, the obturator according to the invention comprises a central dome 1 and a peripheral lip 2. As depicted in FIGS. 3 and 4, an annular part 3 extends between the dome 1 and lip 2.

Figure 2:
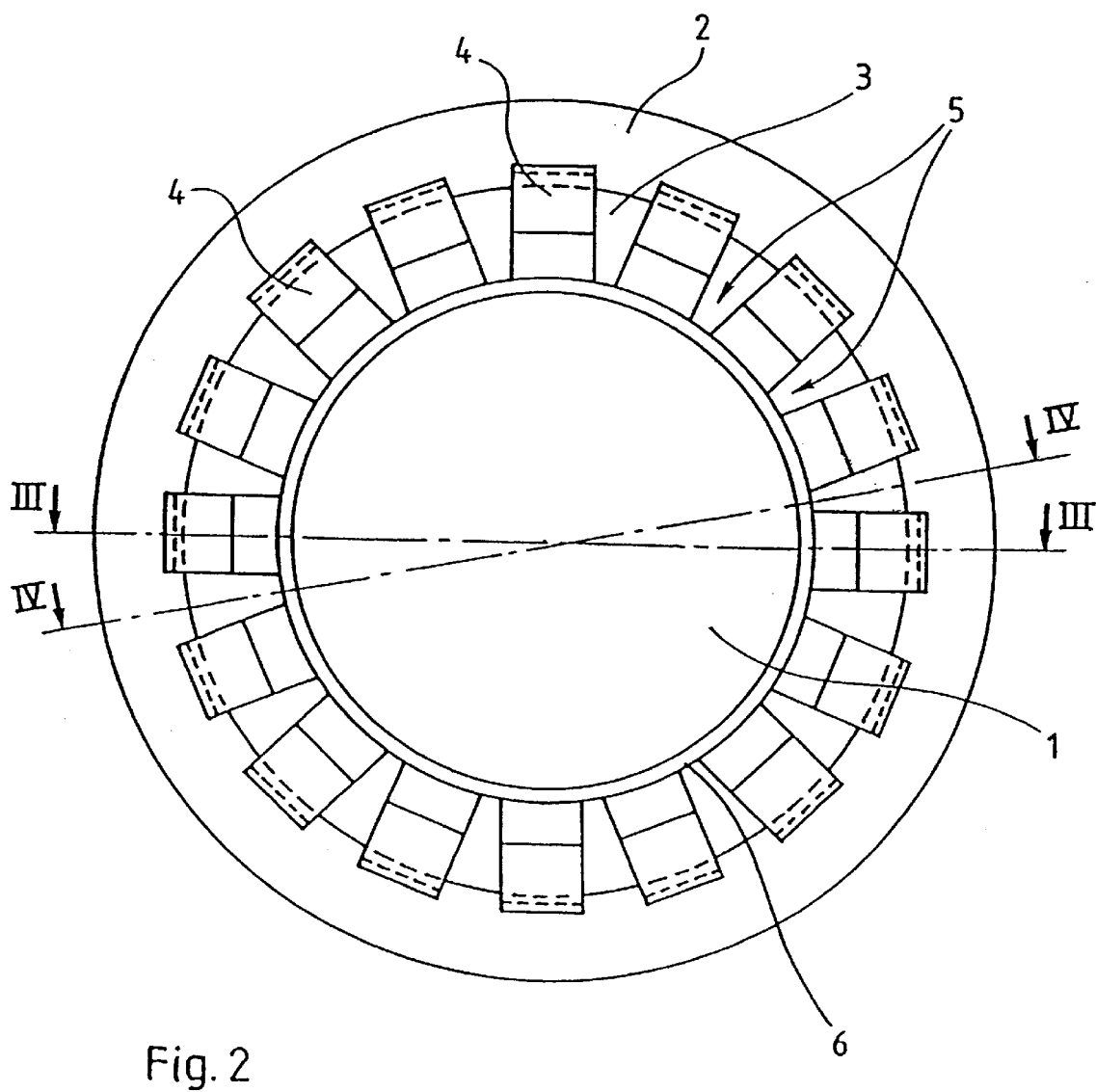
FIG. 2 is an underneath view of the obturator according to the invention.

In the exemplified embodiment as illustrated in FIG. 2, a shoulder is formed by a series of teeth 4 delimited by slots 5. Teeth or shoulders 4 are distributed regularly over a lower face 3a (see e.g., FIG. 3) of the annular part 3. As a non-restrictive example, the number of teeth 4 is equal to 16.

The slots 5 extend over the annular part 3 as far as the dome 1, and thus extend to a connection portion 6 between the annular part 3 and the dome 1 of the obturator.

In this example, the slots 5 also extend to the lip 2.

As best depicted in FIGS. 3 and 4, the annular part 3 is transverse to the peripheral lip 2. This annular part 3 and the peripheral lip 2 thus form around the dome 1 a bentback skirt having a cross section in the shape of an open V.

In, the example this obturator has a circular shape so that the lip 2 and the annular part 3 form concentric crowns around the dome 1, which itself has a circular contour.

The obturator is preferably made from deformable plastics material, moulded in a single piece in a position known as the starting position as illustrated in FIG. 3.

In this starting position of the obturator, the contour of the shoulder formed by the teeth 4 and the end 2a of the lip 2 are coplanar. Furthermore, in this starting position, the teeth 4 extend along a contour substantially identical to the internal contour of the aperture 8.

In this exemplified embodiment, the central portion 1a of the dome furthermore has a thicker part made of plastics material and a face 10 domed towards the outside of the dome 1 in the starting position of the obturator.

The dome 1 is surrounded by the annular part 3 in its starting position and a groove 7 is formed at the level of the connecting portion 6 by the dome 1 and the annular part 3. The annular part 3 is inclined in relation to the wall 1b of the dome 1 so that the groove 7 is flared, the annular part 3 having the shape of a truncated cone narrowing towards the connecting portion 6, whereas the wall 1b of the dome 1 is substantially cylindrical in shape.

When the obturator is positioned on an aperture 8 produced, for example, in a metal sheet 9, the lip 2 is adapted to contact the periphery of the aperture, preferably at end 2a.

The teeth 4 are housed exactly in the aperture 8 by virtue of their external contour which is identical to the contour of aperture 8; this allows the obturator to be positioned easily in the aperture 8.

As the teeth 4 and the lip end 2a are in the same plane, the positioning of the obturator in the aperture 8 and the abutment of the lip 2 on the periphery of the aperture 8 are achieved simultaneously. The insertion of the obturator can thus not commence before the obturator is correctly positioned, and vice versa, as soon as the obturator is positioned, the insertion of the obturator, by the abutment and tilting of the lip as described above, can begin.

The insertion of the obturator into the aperture 8 will now be described, i.e. the passage from its starting position depicted in FIG. 3 to its locking position illustrated in FIG. 4.

When the operator exerts pressure on central part 1a of dome 1, the lip 2 pivots about its end 2a in abutment against the periphery of the aperture 8 and, simultaneously, the annular part 3 assumes an upright orientation while being inserted in the aperture. In the locking position, this annular part 3 has a substantially cylindrical shape, with a common axis with the central axis X of the aperture, which is circular in this example.

The teeth 4 of annular part 3 abut against a lower face 9b of the aperture 8, opposite face 9a of the aperture in contact with the lip 2.

The presence of teeth 4 strengthens annular part 3 so that the annular part does not deform during the obturator insertion but unstead only tilts in the aperture 8. Moreover, the presence of the groove 7 formed by the dome 1 and the annular part 3 enables the tilting of the annular part 3 to be absorbed to a certain extent at the beginning of the insertion of the obturator in the aperture 8.

The lip 2 then tilts more or less as a function of the thickness of the metal sheet in which the aperture 8 is produced, possibly increased by burrs present around the aperture 8.

The insertion force exerted on the dome 1 makes it invert so that its concave shape is inverted. Dome inversion is facilitated in this exemplified embodiment by the presence of slots 5 extending into the connecting portion 6. slots 5 allow the expansion of the annular part 3 between the starting position and the locking position of the obturator.

In the locking position, the connecting portion 6 of the dome 1 with the annular part 3 has a cross section shaped as an S. This connecting portion 6 thus forms a hinge around which the wall 1b of the dome 1 pivots when being inverted.

In this locking position, dome 1 exerts a tensile force on the expanded annular part 3, at the level of the connecting portion 6; this contributes towards maintaining the teeth 4 against the opposite face 9b of the aperture 8. Moreover, the lip 2 is kept in abutment against the face 9a of the aperture so as to guarantee tightness.

The face 10 of the domed central portion 1a is then domed towards the interior of the dome 1 when turned inside out in this locking position so that the force exerted by this central portion on the walls 1b of the dome and transmitted to the annular part 3 is increased.

A reliable attachment of the obturator in the aperture 8 is achieved, with the operator also being informed of the obturation by the noise which the of the dome in the metal structure bearing the aperture can generate.

Figure 5:
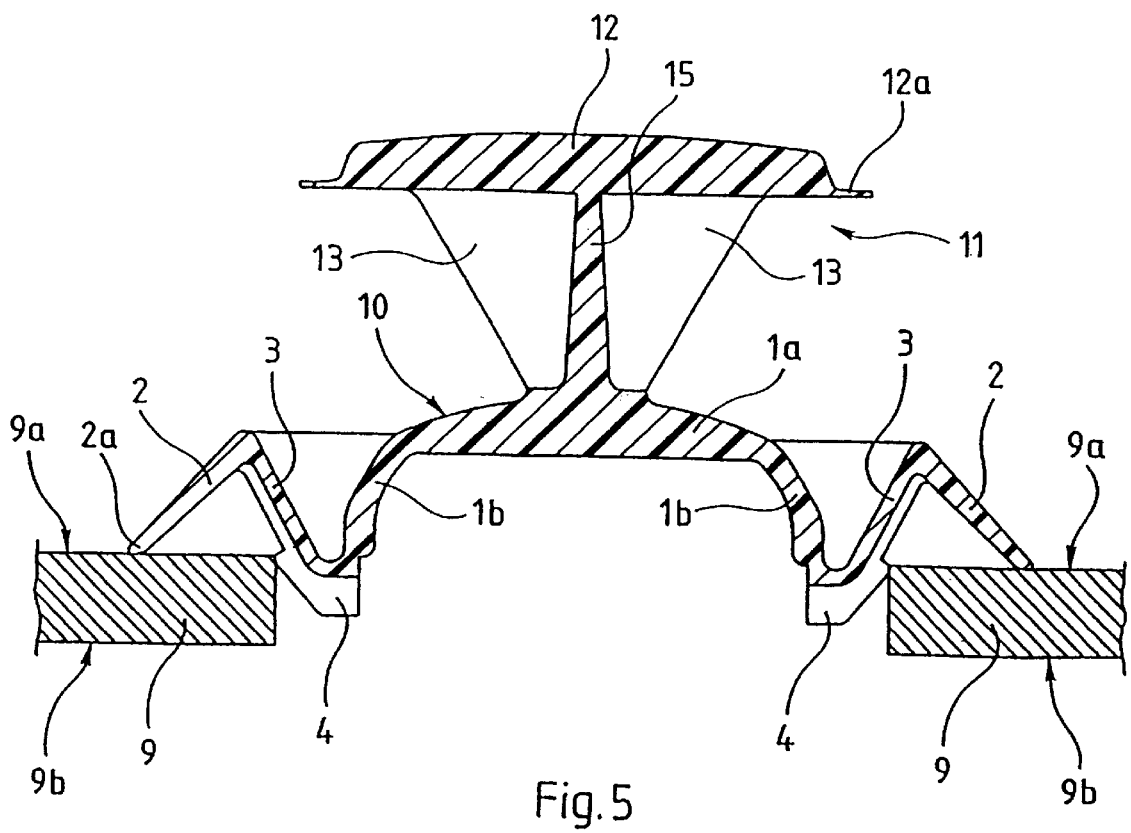
FIG. 5 is a view similar to FIG. 3 of an obturator in accordance with a second embodiment of the invention.
Figure 6:
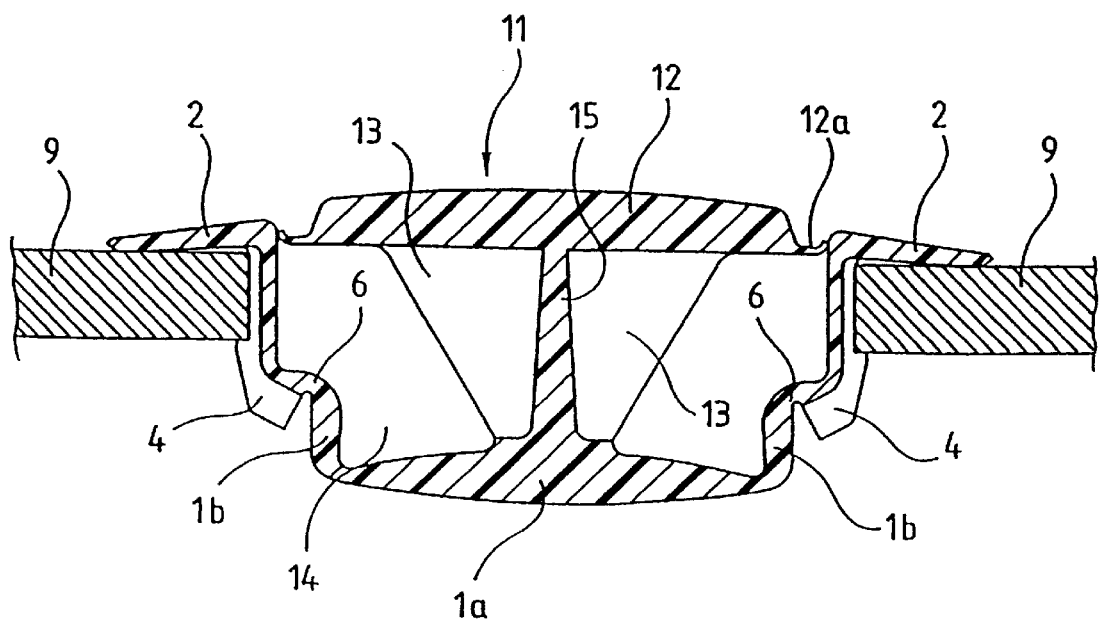
FIG. 6 is a view similar to FIG. 4 of the obturator in accordance with the second embodiment of the invention.

In a second embodiment depicted in FIGS. 5 and 6, the obturator also comprises a plug 11 fixed to the dome 1. Plug 11 comprises a substantially planar cap 12 fixed with a central rod 15 onto the dome central portion 1a. Reinforcing ribs 13 extend between the dome 1 and the cap-forming portion 12 so as to strengthen the attachment of the plug 11 onto the dome 1.

The cap-forming portion 12 comprises, a deformable peripheral rim 12a. In this example, the cap-forming portion 12 has a periphery of reduced thickness which thus forms a flexible peripheral rim 12a.

In this example, the plug 11 is circular in shape and is also moulded in a single piece with the dome 1 in the starting position depicted in FIG. 5.

As depicted in FIG. 6, in the locking position of the obturator, the plug 11 closes the cavity 14 formed by the inverted dome with the annular part 3.

This closing is achieved simultaneously with the locking of the obturator in the aperture 8 of t he metal sheet 9.

The peripheral rim 12a of the cap-forming portion 12 is slightly deformed between the cap-forming portion 12 and the peripheral lip 2 abutting against the face 9a of the aperture. This peripheral rim 12a forms a sealing lip which reinforces the sound-proofing function of the obturator. This seal may be obtained even if slight dimensional differences exist from one aperture to another or from one obturator to another.

The cap-forming portion 12 and the peripheral lip 2 extend substantially in the same plane so as to better limit any thicker par t on the metal sheet 9.

Of course, numerous modifications can be made to the exemplified embodiment described above without departing from the scope of the invention.

Thus, the shoulders could be limited to two teeth disposed symmetrically on the annular part or even be formed by a single peripheral crown forming a continuous shoulder adapted to be housed under the periphery of the aperture.

What is claimed is:

1. An obturator for an aperture (8) produced in a flat metal sheet (9), comprising a central dome (1), a peripheral lip (2) and an annular part (3) extending between said dome (1) and said lip (2), said annular part (3) having a shoulder (4), said dome (1) being adapted to deform between a raised starting position and a lowered position of locking of said obturator, wherein said dome (1) is inverted in relation to the starting position, said annular part (3) being adapted to expand between said starting position and said locking position and to be maintained expanded by said dome (I) inverted in said locking position, the lip (2) being adapted to come into abutment against a face (9a) in said metal sheet surrounding the aperture (8) and the shoulder (4) being adapted to pass through the aperture during inversion of the central dome so as to be in flush abutment against an opposite face (9b) in said metal sheet surrounding said aperture (8) in said locking position; said lip and shoulder thereby coacting by engaging said faces to support the central dome and annular part in said aperture in said locking position; wherein said shoulder (4) is formed by a series of teeth (4) delimited by slots (5).

2. An obturator according to claim 1, wherein the annular part (3) and said dome (1) form a groove (7) in said starting position.

3. An obturator according to claim 1, wherein said teeth (4) are delimited externally by a contour which is substantially identical, in said starting position, to the contour of the aperture (8).

4. An obturator according to claim 3, wherein said contour of the teeth (4) and the end (2a) of the lip (2) are coplanar when the obturator is in said starting position.

5. An obturator according to claim 1, wherein said annular part (3) is substantially transverse to the peripheral lip (2).

6. An obturator according to claim 1, wherein said slots (5) extend over the annular part (3) as far as the dome (1).

7. An obturator according to claim 1, wherein said teeth (4) are distributed regularly over the annular part (3).

8. An obturator according to claim 1, wherein said obturator is circular in shape.

9. An obturator for an aperture (8) produced in a metal sheet (9), comprising a central dome (1), a peripheral lip (2) and an annular part (3) extending between said dome (1) and said lip (2), said annular part (3) having a shoulder (4), said dome (1) being adapted to deform between a raised starting position and a lowered position of locking of said obturator, wherein said dome (1) is inverted in relation to the starting position, said annular part (3) being adapted to expand between said starting position and said locking position and to be maintained expanded by said dome (1) inverted in said locking position, the lip (2) being adapted to come into abutment against a face (9a) in said metal sheet surrounding the aperture (8) and the shoulder (4) being adapted to pass through the aperture during inversion of the central dome so as to be in flush abutment against an opposite face (9b) in said metal sheet surrounding said aperture (8) in said locking position; said lip and shoulder thereby coacting by engaging said faces to support the central dome and annular part in said aperture in said locking position; wherein said shoulder (4) is formed by a series of teeth (4) delimited by slots (5) wherein the central portion (1a) of said dome (1) has a thicker part made of plastics material and a face (10) domed towards the outside of the dome (1) in the starting position and towards the inside of the dome (1) inverted in the locking position.

10. An obturator for an aperture (8) produced in a metal sheet (9), comprising a central dome (1), a peripheral lip (2) and an annular part (3) extending between said dome (1) and said lip (2), said annular part (3) having a shoulder (4), said dome (1) being adapted to deform between a starting position and a position of locking of said obturator, wherein said dome (1) is inverted in relation to the starting position, said annular part (3) being adapted to expand between said starting position and said locking position and to be maintained expanded by said dome (1) inverted in said locking position, the lip (2) being adapted to come into abutment against a face (9a) in said metal sheet surrounding the aperture (8) and the shoulder (4) being adapted to be in abutment against an opposite face (9b) in said metal sheet surrounding said aperture (8) in said locking position and further comprising a plug (11) fixed to the central dome (1) and adapted, in said locking position of the obturator, to close off a cavity (14) formed by the dome (1) inverted and the annular part (3).

11. An obturator according to claim 10, wherein said plug (11) comprises a portion forming a cap (12) and a peripheral rim (12a) which is deformable and adapted to contact against said peripheral lip (2) in the locking position of the obturator.

12. An obturator according to claim 11, wherein the portion forming a cap (12) and the peripheral lip (2) are substantially coplanar in the locking position of the obturator.

* * * * *